United States Patent
Tsai et al.

(10) Patent No.: US 9,905,327 B2
(45) Date of Patent: Feb. 27, 2018

(54) METAL CONDUCTING STRUCTURE AND WIRING STRUCTURE

(71) Applicant: Industrial Technology Research Institute, Hsinchu (TW)

(72) Inventors: Yuan-Ling Tsai, Changhua County (TW); Ying-Jung Chiang, New Taipei (TW); Jiun-Jang Yu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 121 days.

(21) Appl. No.: 14/983,484

(22) Filed: Dec. 29, 2015

(65) Prior Publication Data

US 2017/0148540 A1     May 25, 2017

(30) Foreign Application Priority Data

Nov. 20, 2015 (TW) .............................. 104138405 A (51) Int. Cl.
*H01B 3/30* (2006.01)
*B32B 15/01* (2006.01)
(Continued)

(52) U.S. Cl.
CPC .................. *H01B 3/30* (2013.01); *B32B 3/26* (2013.01); *B32B 3/263* (2013.01); *B32B 3/30* (2013.01);
(Continued)

(58) Field of Classification Search
CPC ........... B32B 15/01; B32B 3/26; B32B 3/263; B32B 3/30; B32B 7/04; B32B 15/04; B32B 15/043; B32B 15/092; B32B 15/16; B32B 15/20; Y10T 428/12451; Y10T 428/12438; Y10T 428/12389; Y10T 428/12396; Y10T 428/12535; Y10T 428/12569;
(Continued)

(56) References Cited

U.S. PATENT DOCUMENTS 4,184,001 A   1/1980 Hildreth
4,650,545 A   3/1987 Laakso et al.
(Continued)

FOREIGN PATENT DOCUMENTS

CN      1993025 A       7/2007
CN      101798683       8/2010
(Continued)

OTHER PUBLICATIONS

Taiwan Patent Office, Notice of Allowance, Patent Application Serial No. 104138405, dated Apr. 14, 2016, Taiwan.
(Continued)

*Primary Examiner* — Michael E. La Villa (57) ABSTRACT

A metal conducting structure includes a first metal conducting layer, a second metal conducting layer, and a third metal conducting layer. The first metal conducting layer consists of a first polymer material and first metal particles. The first metal conducting layer is covered by the second metal conducting layer which is a structure with pores, the structure consists of second metal particles. The second metal conducting layer is covered by the third metal conducting layer. The pores of the second metal conducting layer are filled with a metal material of the third metal conducting layer.

29 Claims, 5 Drawing Sheets

(51) Int. Cl.

| | | |
|---|---|---|
| *B32B 3/26* | (2006.01) | |
| *B32B 7/04* | (2006.01) | |
| *B32B 3/30* | (2006.01) | |
| *B32B 15/04* | (2006.01) | |
| *B32B 15/092* | (2006.01) | |
| *B32B 15/16* | (2006.01) | |
| *B32B 15/20* | (2006.01) | |
| *H01B 1/22* | (2006.01) | |
| *H01B 1/20* | (2006.01) | |

(52) U.S. Cl.
CPC ............ *B32B 7/04* (2013.01); *B32B 15/01* (2013.01); *B32B 15/04* (2013.01); *B32B 15/043* (2013.01); *B32B 15/092* (2013.01); *B32B 15/16* (2013.01); *B32B 15/20* (2013.01); *H01B 1/20* (2013.01); *H01B 1/22* (2013.01); *Y10T 428/1291* (2015.01); *Y10T 428/12389* (2015.01); *Y10T 428/12396* (2015.01); *Y10T 428/12438* (2015.01); *Y10T 428/12451* (2015.01); *Y10T 428/12472* (2015.01); *Y10T 428/12479* (2015.01); *Y10T 428/12486* (2015.01); *Y10T 428/12493* (2015.01); *Y10T 428/12535* (2015.01); *Y10T 428/12569* (2015.01); *Y10T 428/12896* (2015.01); *Y10T 428/12903* (2015.01); *Y10T 428/12931* (2015.01); *Y10T 428/12944* (2015.01); *Y10T 428/12993* (2015.01)

(58) Field of Classification Search
CPC ..... Y10T 428/12896; Y10T 428/12903; Y10T 428/1291; Y10T 428/12931; Y10T 428/12944; Y10T 428/12472; Y10T 428/12479; Y10T 428/12493; Y10T 428/12486; Y10T 428/12993
See application file for complete search history.

(56) References Cited

U.S. PATENT DOCUMENTS

| | | | |
|---|---|---|---|
| 5,383,093 | A | 1/1995 | Nagasaka |
| 5,897,724 | A | 4/1999 | Nagasaka |
| 6,598,292 | B1 | 7/2003 | Segawa et al. |
| 7,135,394 | B2 | 11/2006 | Houng et al. |
| 7,758,927 | B2 | 7/2010 | Miner et al. |
| 7,821,136 | B2 | 10/2010 | Houng et al. |
| 8,449,978 | B2 | 5/2013 | Honda et al. |
| 8,454,859 | B2 | 6/2013 | Lowenthal et al. |
| 8,465,677 | B2 | 6/2013 | Lu et al. |
| 8,911,821 | B2 | 12/2014 | Lu et al. |
| 2009/0107717 | A1 | 4/2009 | Hsu et al. |
| 2011/0186340 | A1* | 8/2011 | Kuramoto ............... H01B 1/22 174/260 |
| 2014/0021492 | A1 | 1/2014 | Wolk et al. |
| 2014/0242343 | A1 | 8/2014 | Free et al. |
| 2014/0318414 | A1 | 10/2014 | Chiou et al. |
| 2015/0200420 | A1 | 7/2015 | Holme et al. |
| 2015/0245470 | A1 | 8/2015 | Su et al. |

FOREIGN PATENT DOCUMENTS

| | | |
|---|---|---|
| CN | 101908388 | 12/2010 |
| CN | 102555323 | 1/2015 |
| CN | 104471739 | 3/2015 |
| EP | 2603065 A1 | 6/2013 |
| TW | 277152 | 6/1996 |
| TW | I243004 | 11/2005 |
| TW | 201141337 A1 | 11/2011 |
| TW | 201146113 A1 | 12/2011 |
| TW | I383590 | 1/2013 |
| TW | I423930 | 1/2014 |
| TW | 201411908 | 3/2014 |
| TW | 201446524 | 12/2014 |
| TW | I471072 | 1/2015 |
| TW | 201534185 | 9/2015 |

OTHER PUBLICATIONS

Mahajan et al., "Facile Method for Fabricating Flexible Substrates with Embedded, Printed Silver Lines", ACS Appl. Mater. Interfaces, Jan. 22, 2014, pp. 1306-1312.

Lin et al., "Electrical performance of the embedded-type surface electrodes containing carbon and silver nanowires as fillers and one-step organosoluble polyimide as a matrix", Organic Electronics, Nov. 2012, pp. 2469-2473.

Tian et al., "Nonvolatile electrical switching behavior observed in a functional polyimide thin film embedded with silver nanoparticles", RSC Advances, Oct. 2012, pp. 9846-9850.

Huang et al., "Highly flexible and transparent film heaters based on polyimide films embedded with silver nanowires", RSC Advances, May 2015, pp. 45836-45842.

Kim et al., "A wearable thermoelectric generator fabricated on a glass fabric", Energy Environ. Sci., Mar. 14, 2014, pp. 1959-1965.

* cited by examiner

Experimental examples

Comparative example

FIG. 8

METAL CONDUCTING STRUCTURE AND WIRING STRUCTURE

CROSS-REFERENCE TO RELATED APPLICATION

This application claims the priority benefits of Taiwan application serial no. 104138405, filed on Nov. 20, 2015. The entirety of the above-mentioned patent application is hereby incorporated by reference herein and made a part of this specification.

TECHNICAL FIELD

The technical field relates to a metal conducting structure and a wiring structure.

BACKGROUND

In the application of printed circuit board (PCB) or flexible printed circuit (FPC), apart from the conventional technique in which copper foil is directly adhered to a substrate, an alternative technique in which polymer permeates the pores of conducting layer has been developed as replacement for copper foil. However, since the surface property of the above-mentioned conducting layer is poor, it is difficult for solder to fully contact the conductive wire, which causes false soldering or even makes it unlikely to solder.

SUMMARY

One of exemplary embodiments comprises a metal conducting structure. The metal conducting structure includes a first metal conducting layer, a second metal conducting layer and a third metal conducting layer. The first metal conducting layer consists of a first polymer material and first metal particles. The second metal conducting layer is on the first metal conducting layer, and the second metal conducting layer consists of second metal particles and has pores. The third metal conducting layer is on the second metal conducting layer, and the pores of the second metal conducting layer are filled with a metal material of the third metal conducting layer.

Another of exemplary embodiments comprises a wiring structure which includes an insulating substrate and the metal conducting structure. The metal conducting structure is formed on the insulating substrate.

Yet another of exemplary embodiments comprises a wiring structure which includes a polymer substrate and the metal conducting structure, wherein the first metal conducting layer in the metal conducting structure is embedded in the polymer substrate.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
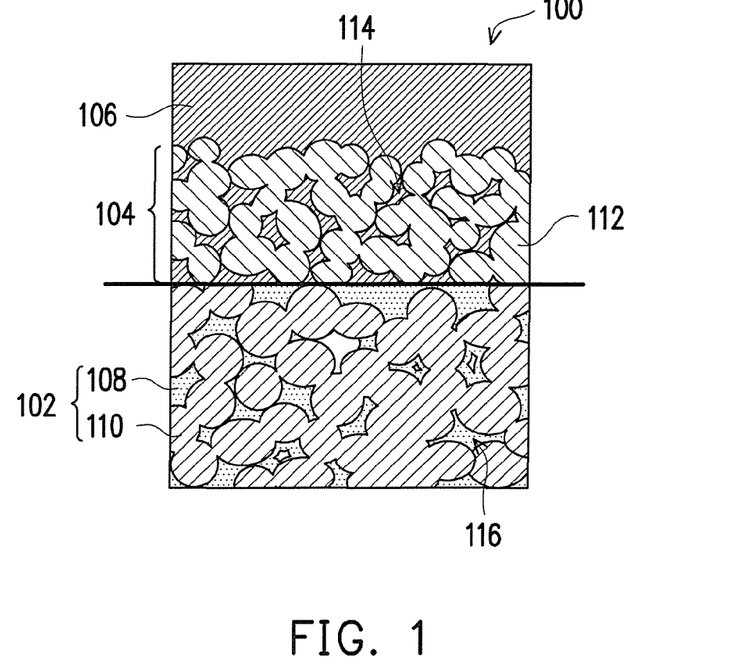
FIG. 1 is a sectional view illustrating a metal conducting structure according to an embodiment of the disclosure.

FIG. 1 is a sectional view illustrating a metal conducting structure according to an embodiment of the disclosure.

Referring to FIG. 1 first, in the embodiment, a metal conducting structure 100 includes a first metal conducting layer 102, a second metal conducting layer 104 and a third metal conducting layer 106. The first metal conducting layer 102 consists of a first polymer material 108 and first metal particles 110. The first polymer material 108 is, for example, polyimide, polyvinylidene fluoride, an epoxy resin, ethyl cellulose or an acrylic polymer. The second metal conducting layer 104 is disposed on the first metal conducting layer 102. The second metal conducting layer 104 consists of second metal particles 112 and has pores 114. The third metal conducting layer 106 is disposed on the second metal conducting layer 104. The pores 114 of the second metal conducting layer 104 are filled with a metal material of the third metal conducting layer 106 after being heated and melted. The second metal particles 112 of the second metal conducting layer 104 are, for example, submicron metal particles that may be silver, copper, nickel or an alloy thereof. In addition, although the disclosure provides no limitation to the material for the first metal particles 110 and the second metal particles 112, it may be adopted the same metal materials. The metal material of the third metal conducting layer 106 may permeate the pores 114 of the second conducting layer 104 and connects with the first metal conducting layer 102 as shown in the drawing; however, the disclosure is not limited thereto. The metal material of the third metal conducting layer 106 may be filled into the pores of the second metal conducting layer 104 without connecting with the first metal conducting layer 102. In addition, a melting point of the metal material of the third metal conducting layer 106 is, for example, lower than the first metal particles 110 and the second metal particles 112. The metal material of the third metal conducting layer 106 may be solder that mainly consists of tin or other metal solder material. Also, the formation of each layer may be controlled through controlling the process temperature without affecting the underlying metal conducting layer that is already formed.

In the embodiment, the first metal particles 110 of the first metal conducting layer 102 are welded together for forming a continuous phase; holes 116 are also included, and the first polymer material 108 is disposed on a portion of surface or entire surface of the holes 116. Alternatively, the holes 116 may be filled up with the first polymer material 108. However, the disclosure is not limited thereto. In one embodiment, the first metal particles 110 may stack up and contact with each other without welding together to form the first metal conducting layer 102, and meanwhile, the pores between the first metal particles 110 are filled with the first polymer material 108.

Figure 2:
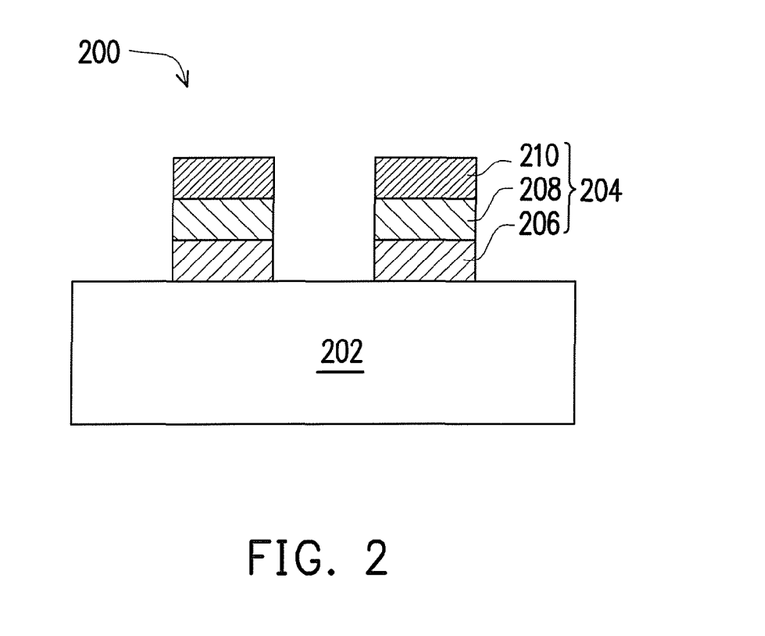
FIG. 2 is a sectional view illustrating a wiring structure according to another embodiment of the disclosure.

FIG. 2 is a sectional view illustrating a wiring structure according to another embodiment of the disclosure. Referring to FIG. 2, a wiring structure 200 in the embodiment includes an insulating substrate 202 and a metal conducting structure 204, wherein the metal conducting structure 204 is formed on the insulating substrate 202. The metal conducting structure 204 includes a first metal conducting layer 206, a second metal conducting layer 208 and a third metal conducting layer 210. Please refer to the previous embodiment for the details of the metal conducting structure. The material of the insulating substrate 202 includes a ceramic material or a second polymer material. The second polymer material includes but is not limited to polyimide or polyvinylidene fluoride. The ceramic material includes but is not limited to aluminum oxide or glass.

Figure 3:
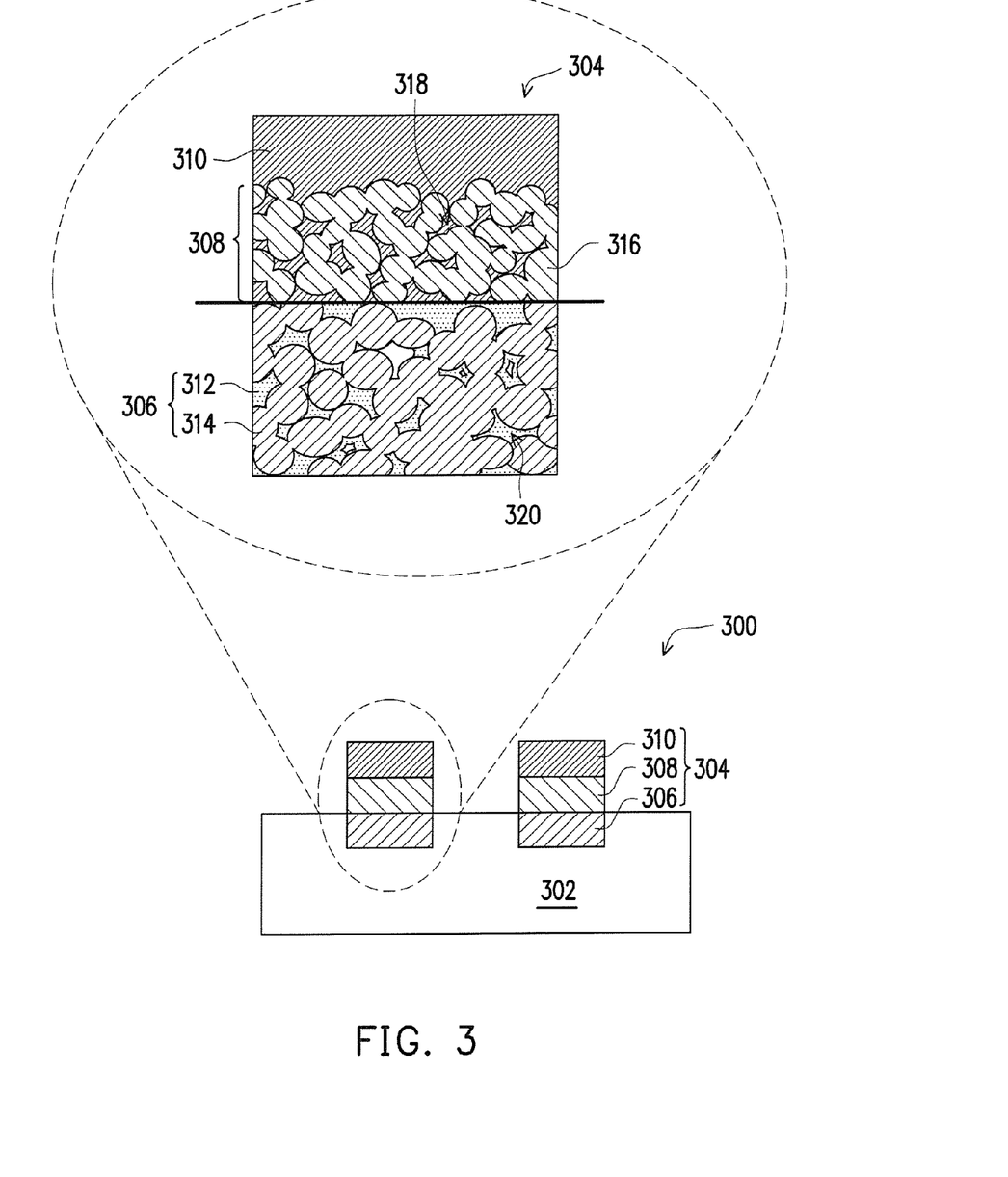
FIG. 3 is a sectional view illustrating a circuit structure according to another embodiment of the disclosure.

FIG. 3 is a sectional view illustrating a wiring structure according to another embodiment of the disclosure. Referring to FIG. 3, in the embodiment, a wiring structure 300 includes a polymer substrate 302 and a metal conducting structure 304, wherein the metal conducting structure 304 includes a first metal conducting layer 306, a second metal conducting layer 308 and a third metal conducting layer 310. The first metal conducting layer 306 is embedded in the polymer substrate 302, and the embedded depth of the first metal conducting layer 304 is, for example, greater than 5 μm. An enlargement view of the metal conducting structure 304 shows the same structure as illustrated by FIG. 1. Please refer to the embodiment illustrated by FIG. 1 for the parameters and the constitution of materials.

In FIG. 3, the first metal conducting layer 306 consists of the first polymer material 312 and the first metal particles 314 and may have holes 320. Under the circumstances where the materials of the polymer substrate 302 and the first polymer material 312 of the metal conducting structure 304 are the same, it would be beneficial to attach the polymer substrate 302 and the metal conducting structure 304 together, such that flexibility can be acquired and element reliability can be enhanced. The material of the polymer substrate 302 is, for example, polyimide and polyvinylidene fluoride. Please refer to Taiwan patent publication TW201534185A for details concerning the process and parameters of the first metal conducting layer 306. The second metal conducting layer 308 consists of second metal particles 316 and has pores 318. The third metal conducting layer 310 is on the second metal conducting layer 308 and the pores 318 are filled with a metal material of the third metal conducting layer 310.

The following Experimental examples and a Comparative example are provided to exemplify the effect of the disclosure; however, the disclosure is not limited to the following examples.

Experimental Example 1

First, $C_{11}H_{23}OOAg$ is dissolved in Xylene. Thereafter, 100-300 nm of nano spherical metal silver powder is mixed with above solution to prepare a metal ink having solid content of 85% and viscosity at 100,000 cP. Next, a screen with 325 meshes is employed to print the prepared metal ink on a glass carrier, and then the printed glass carrier is sintered at a sintering temperature of 300° C. for 30 minutes so as to form the first metal conducting layer having holes. The size of each of the holes is larger than 0.5 μm.

Thereafter, the PI solution having a solid content of about 20% is coated with a blade of 300 μm into a film, and the holes of the first metal conducting layer are filled with the PI solution. A curing process is then performed at a temperature of 210° C. for 60 minutes so as to obtain a transparent polyimide film.

Figure 4:
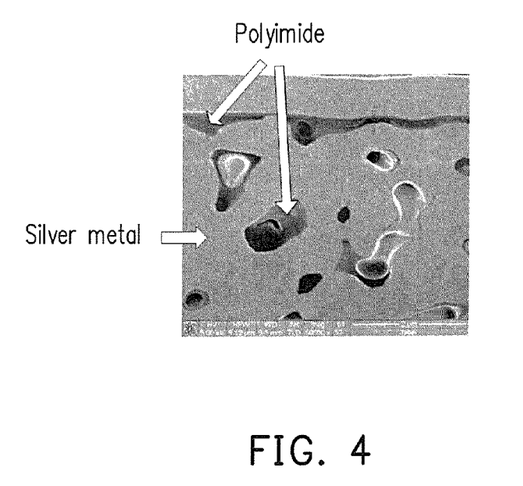
FIG. 4 is a sectional SEM view illustrating a polyimide film obtained through an Experimental example 1.

FIG. 4 is a sectional SEM view illustrating the polyimide film obtained through an Experimental example 1. The light-gray part represents the material of the first metal conducting layer, which is silver in the Experimental example 1. The figure shows that the metal structure of the first metal conducting layer has a continuous phase, which is formed by welding the first metal particles together at 300° C. sintering process. Also, the first metal conducting layer has holes. The first polymer material permeates the first metal conducting layer via the holes as shown in the dark-gray part of the figure. Accordingly, there is also the first polymer material on the surface of the first metal conducting layer. In the present Experimental example, the first polymer material is polyimide.

Next, a simple machine is used for cutting to remove the whole polyimide film embedded in the first metal conducting layer from the glass carrier.

Figure 5:
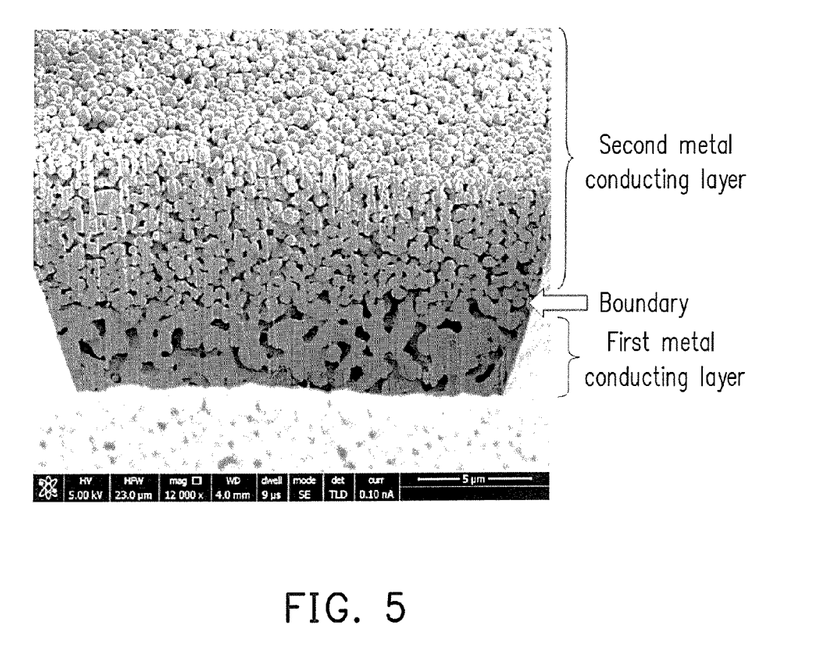
FIG. 5 is a sectional SEM view illustrating a double-layered structure obtained through the Experimental example 1.

Then, the same printing method is performed on the first metal conducting layer. A second layer of metal ink is screen printed thereon, and a sintering process is conducted at a sintering temperature of 200° C. for 30 minutes such that the second metal particles in the second layer of metal ink are welded together to form the second metal conducting layer with pores. As shown in FIG. 5, the size of each of the pores is larger than 0.5 μm. In the present Experimental example, since the same metal ink is employed, the metal particles in the first and second metal conducting layers are silver metal particles.

In FIG. 5, a boundary between the first metal conducting layer and the second metal conducting layer is marked. Since the first metal particles are sintered at a temperature of 300° C., the metal particles are welded in a more apparent manner than the second metal particles; however, the disclosure is not limited thereto. The process parameters may be adjusted to change the manner of welding the metal particles.

Figure 6:
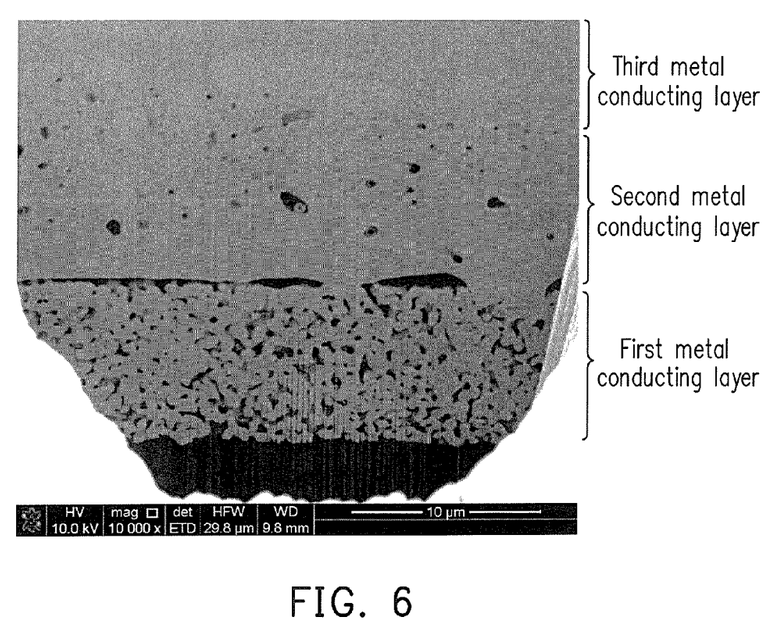
FIG. 6 is a sectional SEM view illustrating a metal conducting structure according to the Experimental example 1.

Finally, after coating solder on the second metal conducting layer and heating, the third metal conducting layer is formed, and the pores of the second metal conducting layer are filled with the metal material of the third metal conducting layer as shown in FIG. 6. The solder used in the present Experimental example is Sn—Ag—Cu and a reflow temperature is 280° C.

Comparative Example 2

A metal wiring structure is manufactured using the process as described in the [Experimental example 1], but the step of manufacturing the second metal conducting layer is omitted, and solder is directly plated on the first metal conducting layer.

Experimental Example 2

A commercial low-temperature curing silver paste is used, and a screen having 325 meshes is employed to print the commercial low-temperature silver paste on a substrate to be roasted at a temperature of 130° C. so as to form the first metal conducting layer.

Figure 7:
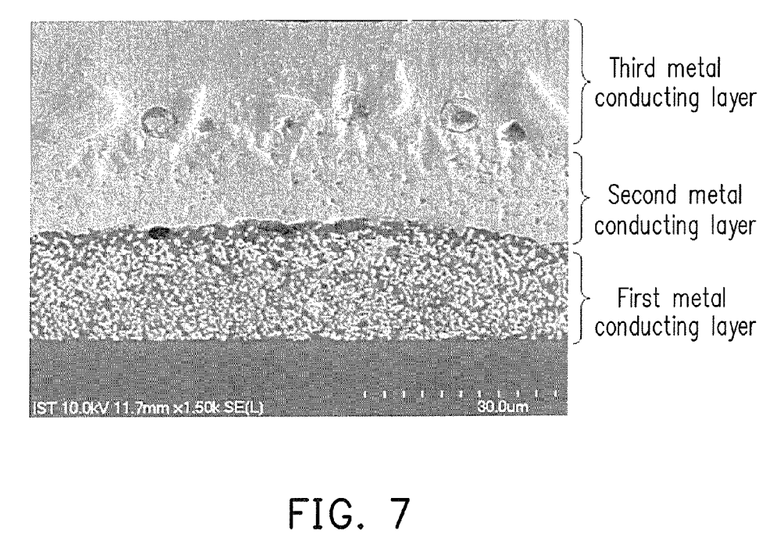
FIG. 7 is a sectional SEM view illustrating a metal conducting structure according to an Experimental example 2.

Thereafter, the second and third metal conducting layers are manufactured using the same steps as described in [Experimental example 1] to complete the metal wiring structure as shown in FIG. 7.

[Analysis of Characteristics]

A peel test is conducted to the above-mentioned Experimental examples 1 and 2 respectively. The test is conducted under the condition where 10 samples from each group are adopted; the peel strength is set to be ≥0.6 kg/cm as the standard to determine the yield rate of the solder test. The result shows that the yield rate of the Comparative example is 10%, whereas the yield rates of the Experimental examples 1-2 are 100%.

Accordingly, both of the Experiment example 1 and Experimental example 2 exhibit an excellent welding characteristic compared to the Comparative example 1.

Figure 8:
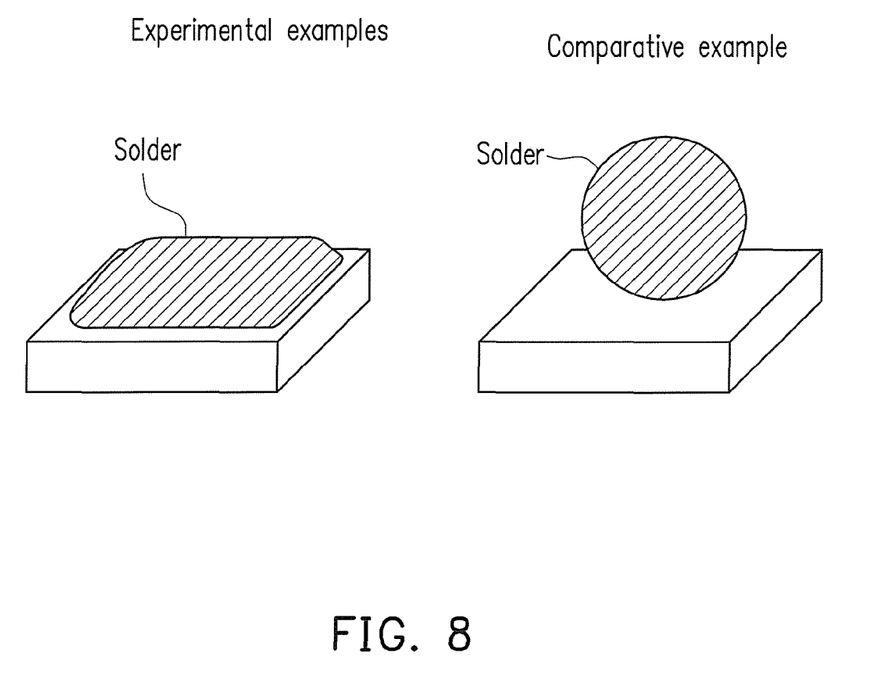
FIG. 8 is a schematic view illustrating an Experimental example and a Comparative example.

Referring to FIG. 8, specifically, FIG. 8 is a schematic view showing the Experimental examples (including Experimental example 1 and Experimental example 2) and the Comparative example. In the Comparative example, it is difficult to spread the solder smoothly on the first metal conducting layer that is not covered by the second metal conducting layer. However, as exhibited by the Experimental examples, both of the Experimental example 1 and Experimental example 2 show that, since the first metal conducting layer is covered by the second metal conducting layer as a buffering layer, after being plated with solder, the solder (i.e. the third metal conducting layer) can be spread smoothly on the second conducting layer, which exhibits good adherence and it is easy for welding to be conducted.

In addition, in the Experimental examples 1-2, a bending test (bending radius is 0.38 cm, bending times is 1,000) is performed after the second metal conducting layer is formed. The result shows that the second metal conducting layers are intact without damage. Accordingly, it can be obtained that the wiring structure of the disclosure also has flexibility and high reliability.

In view of the foregoing embodiments of the disclosure, the second metal conducting layer having pores is formed on the first metal conducting layer including the first polymer material, such that the melted metal material is filled into the pores of the second metal conducting layer when another metal conducting layer is formed on the second metal conducting layer, and the melted metal material even permeates the pores and connects with the first metal conducting layer. Accordingly, good and stable solderability can be attained. Meanwhile, the wiring structure formed via the above-mentioned metal conducting structure also retains the characteristics of flexibility and high reliability. Also, the disclosure achieves a novel flexible substrate including the conducting circuit structure used in application of super-thin polymer substrate and circuit formation, and thus it may carry out the properties such as entire integrated structure thinning. Hence, the novel flexible substrate can be effectively used in application of flexible displays such as flexible light emitting diode (LED) package substrates, touch panels, displays and the like, and also can be used in bonding of high-power electronic chips, thinning package, and related applications in electronic circuit.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A metal conducting structure, comprising:
   a first metal conducting layer comprising a first polymer material and a plurality of first metal particles;
   a second metal conducting layer, disposed on the first metal conducting layer, the second metal conducting layer comprising a plurality of second metal particles having a plurality of pores formed there between; and
   a third metal conducting layer, disposed on the second metal conducting layer, wherein the second metal conducting layer further comprises a metal material of the third metal conducting layer filled into the pores.

2. The metal conducting structure according to claim 1, wherein the first metal conducting layer comprises a continuous phase formed by welding the first metal particles, wherein a plurality of holes are formed between the first metal particles, and the first polymer material is disposed on a surface of the holes.

3. The metal conducting structure according to claim 1, wherein the metal material of the third metal conducting layer filled into the pores formed between the second metal particles of the second metal conducting layer connects with the first metal conducting layer.

4. The metal conducting structure according to claim 1, wherein the first metal conducting layer is formed by stacking up the first metal particles so that the first metal particles contact with each other without being welded together, wherein a plurality of holes are formed between the first metal particles, and the holes between the first metal particles are filled with the first polymer material.

5. The metal conducting structure according to claim 1, wherein the first polymer material comprises polyimide, polyvinylidene fluoride, an epoxy resin, ethyl cellulose or an acrylic polymer.

6. The metal conducting structure according to claim 1, wherein the second metal particles comprise silver, copper, nickel or an alloy of silver, copper, or nickel.

7. The metal conducting structure according to claim 1, wherein a material of the first metal particles is the same as a material of the second metal particles.

8. The metal conducting structure according to claim 1, wherein a melting point of the metal material of the third metal conducting layer is lower than that of the second metal particles.

9. A wiring structure, comprising:
   an insulating substrate; and
   a metal conducting structure, disposed on the insulating substrate, the metal conducting structure comprising:
   a first metal conducting layer comprising a first polymer material and a plurality of first metal particles;
   a second metal conducting layer, disposed on the first metal conducting layer, the second metal conducting layer comprising a plurality of second metal particles having a plurality of pores formed there between; and
   a third metal conducting layer, disposed on the second metal conducting layer, wherein the second metal conducting layer further comprises a metal material of the third metal conducting layer filled into the pores.

10. The wiring structure according to claim 9, wherein a material of the insulating substrate comprises a ceramic material or a second polymer material.

11. The wiring structure according to claim 10, wherein the ceramic material comprises aluminum oxide or glass, and the second polymer material comprises polyimide or polyvinylidene fluoride.

12. The wiring structure according to claim 9, wherein the first metal conducting layer comprises a continuous phase formed by welding, wherein a plurality of holes are formed between the first metal particles, and the first polymer material is disposed on a surface of the holes.

13. The wiring structure according to claim 9, wherein the metal material of the third metal conducting layer filled into the pores formed between the second metal particles of the second metal conducting layer connects with the first metal conducting layer.

14. The wiring structure according to claim 9, wherein the first metal conducting layer is formed by stacking up the first metal particles so that the first metal particles contact with each other without being welded together, wherein a plurality of holes are formed between the first metal particles, and the holes between the first metal particles are filled with the first polymer material.

15. The wiring structure according to claim 9, wherein the first polymer material comprises polyimide, polyvinylidene fluoride, an epoxy resin, ethyl cellulose or an acrylic polymer.

16. The wiring structure according to claim 9, wherein the second metal particles comprise silver, copper, nickel or an alloy of silver, copper, or nickel.

17. The wiring structure according to claim 9, wherein a material of the first metal particles is the same as a material of the second metal particles.

18. The wiring structure according to claim 9, wherein a melting point of the metal material of the third metal conducting layer is lower than that of the second metal particles.

19. A wiring structure, comprising:
  a polymer substrate, and
  a metal conducting structure, comprising:
    a first metal conducting layer comprising a first polymer material and a plurality of first metal particles, wherein the first metal conducting layer is embedded in the polymer substrate;
    a second metal conducting layer, disposed on the first metal conducting layer, the second metal conducting layer comprising a plurality of second metal particles having a plurality of pores formed there between; and
    a third metal conducting layer, disposed on the second metal conducting layer, wherein the second metal conducting layer further comprises a metal material of the third metal conducting layer filled into the pores.

20. The wiring structure according to claim 19, wherein a material of the polymer substrate is the same as a material of the first polymer material in the metal conducting structure.

21. The wiring structure according to claim 19, wherein a material of the polymer substrate comprises polyimide or polyvinylidene fluoride.

22. The wiring structure according to claim 19, wherein an embedded depth of the first metal conducting layer embedded in the polymer substrate is larger than 5 μm.

23. The wiring structure according to claim 19, wherein the first metal conducting layer comprises a continuous phase formed by welding the first metal particles, wherein a plurality of holes are formed between the first metal particles, and the first polymer material is disposed on a surface of the holes.

24. The wiring structure according to claim 19, wherein the metal material of the third metal conducting layer filled into the pores formed between the second metal particles of the second metal conducting layer connects with the first metal conducting layer.

25. The wiring structure according to claim 19, wherein the first metal conducting layer is formed by stacking up the first metal particles so that the first metal particles contact with each other without being welded together, wherein a plurality of holes are formed between the first metal particles, and the holes between the first metal particles are filled with the first polymer material.

26. The wiring structure according to claim 19, wherein the first polymer material comprises polyimide, polyvinylidene fluoride, an epoxy resin, ethyl cellulose or an acrylic polymer.

27. The wiring structure according to claim 19, wherein the second metal particles comprise silver, copper, nickel, or an alloy of silver, copper, or nickel.

28. The wiring structure according to claim 19, wherein a material of the first metal particles is the same as a material of the second metal particles.

29. The wiring structure according to claim 19, wherein a melting point of the metal material of the third metal conducting layer is lower than that of the second metal particles.

* * * * *